United States Patent
Tarao

(10) Patent No.: US 7,999,054 B2
(45) Date of Patent: Aug. 16, 2011

(54) GOLF BALL

(75) Inventor: Toshiyuki Tarao, Kobe (JP)

(73) Assignee: SRI Sports Limited, Kobe (JP)

( * ) Notice: Subject to any disclaimer, the term of this patent is extended or adjusted under 35 U.S.C. 154(b) by 331 days.

(21) Appl. No.: 12/219,191

(22) Filed: Jul. 17, 2008

(65) Prior Publication Data

US 2009/0023515 A1    Jan. 22, 2009

(30) Foreign Application Priority Data

Jul. 18, 2007 (JP) ................................ 2007-187458

(51) Int. Cl.
*A63B 37/12* (2006.01)
*A63B 37/00* (2006.01)
*C08G 18/62* (2006.01)
*C08G 18/86* (2006.01)

(52) U.S. Cl. .......... 528/75; 525/131; 525/453; 525/454; 525/455; 525/460; 473/378

(58) Field of Classification Search ........................ None
See application file for complete search history.

(56) References Cited

U.S. PATENT DOCUMENTS

| 6,582,326 | B2 | 6/2003 | Wu et al. | |
|---|---|---|---|---|
| 2004/0097653 | A1* | 5/2004 | Kim et al. ..................... | 525/130 |
| 2006/0009309 | A1* | 1/2006 | Rajagopalan et al. ......... | 473/371 |
| 2007/0270242 | A1* | 11/2007 | Keller et al. .................. | 473/371 |
| 2009/0286625 | A1* | 11/2009 | Petrichko et al. ............. | 473/378 |

FOREIGN PATENT DOCUMENTS

JP       2003-515399 A       5/2003

OTHER PUBLICATIONS

Huang, Gas Permeability of Crosslinked HTPB-H12MDI-Based Polyurethane Membrane, Journal of Applied Polymer Science vol. 58; 1995; pp. 1913-1923.*

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball having a polyurethane cover, which is in excellent in abrasion resistance and durability without lowering the productivity. The present invention provides a golf ball comprising a core and a cover covering the core, wherein the cover is formed from a cover composition containing a thermoplastic polyurethane containing a polyol having an unsaturated carbon-carbon bond as a constituent, and a crosslinking agent.

8 Claims, No Drawings

GOLF BALL

BACKGROUND OF THE INVENTION

1. Field of the Invention

The present invention relates to a golf ball having a cover, and in particular to a technique for improving abrasion resistance and durability of the cover formed by using a thermoplastic polyurethane as a resin component.

2. Description of the Related Art

As resin components constituting the covers of golf balls, ionomer resins and polyurethanes have been used. Since golf balls having a cover made from an ionomer resin are excellent in repulsion, durability, processability, and the like, they have been widely used. However, problems are pointed out that the golf balls are inferior in shot feeling, insufficient in spin performance, inferior in controllability, and the like due to the high stiffness and hardness of these balls. On the other hand, when polyurethanes are used as the resin component constituting the cover, it is known that the shot feeling and spin property are improved as compared with those of ionomer resins.

For example, Japanese Patent Publication (Laid-Open) No. 2003-515399 discloses, as a golf ball having a polyurethane cover, a golf ball including at least one cover layer, wherein the cover layer is formed from a composition comprising at least one polyurethane containing a hydrophobic backbone, said cover layer having a thickness of from about 0.51 mm (about 0.02 inch) to about 8.89 mm (about 0.35 inch), a hardness of at least about 40 Shore D, a specific gravity of at least about 0.7, a flexural modulus of at least about 3.4 MPa (about 500 psi) and at least about 60 percent dimple coverage, said golf ball having an Atti compression of from about 55 to about 120.

By the way, the polyurethane as the resin component of the cover includes a thermosetting (two-component curable) polyurethane and a thermoplastic polyurethane. In the case of using the thermosetting (two-component curable) polyurethane, a crosslinked structure can be formed and therefore the abrasion resistance of the cover can be improved. However, it is necessary to control the curing reaction during the molding of the cover, and therefore there is a problem that the production process is complicated. On the other hand, in the case of using the thermoplastic polyurethane, since it is possible to mold a cover by directly injecting a cover composition onto a core, the productivity is excellent as compared with that of the thermosetting (two-component curable) polyurethane.

SUMMARY OF THE INVENTION

There has been a problem that a golf ball having a cover using a thermoplastic polyurethane as a resin component is not provided with sufficient abrasion resistance and durability at the time of hitting the golf ball, although its productivity is excellent.

In view of the above circumstances, an object of the present invention is to provide a golf ball which has a cover using a thermoplastic polyurethane as a resin component and which is in excellent in abrasion resistance and durability without lowering the productivity.

The golf ball of the present invention which solves the above-mentioned problems is a golf ball comprising a core and a cover covering the core, wherein the cover is formed from a cover composition containing a thermoplastic polyurethane containing a polyol having an unsaturated carbon-carbon bond as a constituent, and a crosslinking agent.

The subject matter of the present invention resides in the point that the composition containing the thermoplastic polyurethane containing the polyol having an unsaturated carbon-carbon bond as a constituent and the crosslinking agent is used as the cover composition. If the composition containing the thermoplastic polyurethane containing the polyol having the unsaturated carbon-carbon bond as the constituent and the crosslinking agent is used as the cover composition, the crosslinking reaction does not proceed so much at the beginning of molding the cover, due to the less heat history of the cover composition. Thus, the cover composition can easily be molded into a cover. Accordingly, the cover can be molded in the same way of using a conventional thermoplastic polyurethane and the productivity of the golf ball is not lowered. Then, during the cover molding, the crosslinking reaction proceeds in accordance with the heat history of the cover composition, and therefore a crosslinked structure is finally formed in the produced cover. As a result, it is possible to obtain the golf ball excellent in abrasion resistance and durability. As an embodiment of the crosslinked structure, for example, the crosslinked structure is formed by the reaction of the unsaturated carbon-carbon bonds of the thermoplastic polyurethane with the crosslinking agent.

The above-mentioned crosslinking agent is preferably a radical polymerization initiator. The radical polymerization initiator preferably includes an organic peroxide or an azo compound. The above-mentioned radical polymerization initiator preferably has a 10-hour half-life temperature of 60° C. or more. Further, the cover composition preferably contains 0.05 part to 5 parts by weight of the crosslinking agent with respect to 100 parts by weight of the thermoplastic polyurethane.

The polyol having the unsaturated carbon-carbon bond is preferably a hydroxyl group-containing diene polymer, more preferably a polybutadiene polyol.

The content of the polyol having the unsaturated carbon-carbon bond in the polyol component constituting the above-mentioned thermoplastic polyurethane is preferably 5% to 60% by mole, and the number of unsaturated carbon-carbon bond per unit mass in the thermoplastic polyurethane before crosslinking with the crosslinking agent is preferably $0.3 \times 10^{-3}$ mol/g or more and less than $7.9 \times 10^{-3}$ mol/g.

Further, the slab hardness of the cover composition is preferably 30 to 70 in Shore D hardness.

DESCRIPTION OF THE PREFERRED EMBODIMENTS

The golf ball of the present invention include a core and a cover covering the core, wherein the cover is formed from a cover composition containing a thermoplastic polyurethane containing a polyol having an unsaturated carbon-carbon bond as a constituent and a crosslinking agent.

First, the thermoplastic polyurethane which contains the polyol having the unsaturated carbon-carbon bond as a constituent and is contained as a resin component in the cover composition used in the present invention will be described.

The above-mentioned thermoplastic polyurethane is not particularly limited, as long as the thermoplastic polyurethane has thermoplasticity and comprises the polyol component containing the polyol having the unsaturated carbon-carbon bond as a constituent and has a plurality of urethane bonds in the molecular chain. For example, the thermoplastic polyurethane includes a reaction product obtained by the reaction of a polyisocyanate component, the polyol component containing the polyol having the unsaturated carbon-carbon bond, and if necessary, a chain extender.

The above-mentioned polyol having the unsaturated carbon-carbon bond is not particularly limited, as long as it contains at least one polymerizable unsaturated carbon-carbon bond and a plurality of hydroxyl groups in the molecule thereof, and preferably includes a diol having at least one polymerizable unsaturated carbon-carbon bond and two hydroxyl groups.

The polyol having the unsaturated carbon-carbon bond may include, for example, a hydroxyl group-containing diene polymer. Examples of the hydroxyl group-containing diene polymer includes a hydroxyl group-containing polybutadiene, a hydroxyl group-containing polypentadiene (preferably a hydroxyl group-containing polyisoprene), a hydroxyl group-containing polyhexadiene, a copolymer thereof (a hydroxyl group-containing polybutadiene-polyisoprene), and the like. The above-mentioned polyol having the unsaturated carbon-carbon bond may be used alone or as a mixture of two or more kinds thereof. The location of hydroxyl groups in the molecular chain of the hydroxyl group-containing diene polymer is not limited, and examples of the hydroxyl group-containing diene polymer may include a hydroxyl group-containing diene polymer having hydroxyl groups at both terminals of the main molecular chain, a hydroxyl group-containing diene polymer having hydroxyl groups at the terminal of the side molecular chain and at the terminal of the molecular main chain, and the like.

Examples of the hydroxyl group-containing diene polymer having hydroxyl groups at both terminals of the molecular main chain may include a polybutadiene having hydroxyl groups at the both terminals thereof, a polypentadiene having hydroxyl groups at the both terminals thereof, a polyhexadiene having hydroxyl groups at the both terminals thereof, a poly(2-methylbutadiene) having hydroxyl groups at the both terminals of the molecular main chain, a poly(2-ethylbutadiene) having hydroxyl groups at the both terminals of the molecular main chain, and a poly(2,3-dimethylbutadiene) having hydroxyl groups at both terminals of the molecular main chain, and the like. These hydroxyl group-containing diene polymers may be used alone or in combination of two or more kinds thereof. Among them, the polybutadiene having hydroxyl groups at both terminals thereof is preferable.

The above-mentioned hydroxyl group-containing diene polymer may be obtained by polymerizing a diene monomer with the use of a hydroxyl group-containing polymerization initiator. Further, the hydroxyl group-containing diene polymer to be used in the present invention may include a hydroxyl group-containing diene polymer obtained by copolymerizing two or more kinds of diene monomers or a diene monomer and another addition polymerizable monomer.

Examples of the hydroxyl group-containing polymerization initiators may include, for example, hydrogen peroxide, cyclohexanone peroxide, methylcyclohexanone peroxide, 2,2'-azobis[2-methyl-N-(2-hydroxyethyl)propione amide], and the like. As the above-mentioned diene monomers, for example, butadiene, pentadiene, hexadiene, isoprene, chloroprene, cyclopentadiene, or the like may be used alone or as a mixture of two or more kinds thereof. Examples of the above-mentioned addition polymerizable monomer to be copolymerized with the diene monomer may include styrene, α-methylstyrene, acrylonitrile, acrylic acid and the ester thereof, methacrylic acid and the ester thereof, vinyl chloride, vinyl acetate, butene, pentene, and the like. The amount of the addition polymerizable monomer used is preferably 50% by mole or less in the entire monomers, more preferably 40% by mole or less in the entire monomers, and even more preferably 30% by mole or less in the entire monomers.

The above-mentioned polyol having the unsaturated carbon-carbon bond preferably has, without limitation, the number average molecular weight of 600 or more, and more preferably 800 or more. If the number average molecular weight is too small, the abrasion resistance may possibly be decreased. Further, the number average molecular weight is not particularly limited, however it is preferably 10,000 or less and more preferably 8,000 or less.

Typical examples of the hydroxyl group-containing diene polymer may include R-45HT (Liquid polybutadiene having hydroxyl group at the both terminals thereof, hydroxyl value: 46.6 mg KOH/g) and Poly ip (Liquid polyisoprene having hydroxyl groups at the both terminal thereof, hydroxyl value: 46.6 mg KOH/g) manufactured by Idemitsu Atofina Corp.

The thermoplastic polyurethane to be used in the present invention may contain, as the polyol component, in addition to the polyol having the unsaturated carbon-carbon bond, a general-purpose polyol having no unsaturated carbon-carbon bond. Examples of the general-purpose polyol may include, a polyether polyol such as polyoxyethylene glycol (PEG), polyoxypropylene glycol (PPG), polyoxytetramethylene glycol (PTMG) and the like; a condensation polyester polyol such as polyethylene adipate (PEA), polybutylene adipate (PBA), polyhexamethylene adipate (PHMA), and the like; a lactone-based polyester polyol such as poly(ε-caprolactone), and the like; a polycarbonate polyol such as polyhexamethylene carbonate, and the like; an acrylic polyol; and the like, and these polyols may be used as a mixtures of at least two or more kinds thereof.

The hydroxyl value of the general-purpose polyol having the unsaturated carbon-carbon bond is preferably less than 150 mg KOH/g, more preferably 120 mg KOH/g or less, and even more preferably 60 mg KOH/g or less, and preferably 10 mg KOH/g or more, more preferably 20 mg KOH/g or more, and even more preferably 30 mg KOH/g or more. The above-mentioned hydroxyl value of the general-purpose polyol having the unsaturated carbon-carbon bond can be measured by, for example, an acetylation method according to JIS K 1557-1.

The content of the polyol having the unsaturated carbon-carbon bond in the polyol component constituting the thermoplastic polyurethane in the present invention is preferably 5% by mole or more, more preferably 10% by mole or more, and even more preferably 15% by mole or more. Further, the content of the polyol having the unsaturated carbon-carbon bond is preferably 60% by mole or less, more preferably 55% by mole or less, and even more preferably 50% by mole or less. If the content of the polyol having the unsaturated carbon-carbon bond exceeds 60% by mole, the crosslinking structure becomes so much. As a result, the cover is likely to become hard and fragile. If the content is less than 5% by mole, the crosslinking structure may be too little to improve the abrasion resistance of the cover.

The above-mentioned polyol component of the thermoplastic polyurethane used in the present invention preferably includes polyoxytetramethylene glycol (PTMG) as the general-purpose polyol having no unsaturated carbon-carbon bond and polybutadienepolyol as the polyol having the unsaturated carbon-carbon bond. In particular, it is preferable that the mixing ratio of PTMG/polybutadienepolyol is 60% by weight to 90% by weight/10% by weight to 40% by weight in total of polyoxytetramethylene glycol (PTMG) and polybutadienepolyol (total: 100% by weight).

The polyisocyanate component constituting the thermoplastic polyurethane used in the present invention is not particularly limited, as long as it has two or more isocyanate groups. Such examples include an aromatic polyisocyanate such as 2,4-tolylene diisocyanate, 2,6-tolylene diisocyanate, a mixture of 2,4-tolylene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); an alicyclic polyisocyanate or an aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used alone or a mixture of two or more kinds.

In view of improving the abrasion-resistance, as the polyisocyanate component constituting the thermoplastic polyurethane, it is preferred to use an aromatic polyisocyanate. By using the aromatic polyisocyanate, the mechanical property of the resultant thermoplastic polyurethane is improved, and the cover which is excellent in the abrasion-resistance can be obtained. Further, in view of improving the weather resistance, as the polyisocyanate component constituting the thermoplastic polyurethane, it is preferred to use a non-yellowing type polyisocyanate such as TMXDI, XDI, HDI, $H_6$XDI, IPDI, $H_{12}$MDI and NBDI, more preferably 4,4'-dicyclohexylmethane diisocyanate ($H_{12}$MDI). It is because 4,4'-dicyclohexylmethane diisocyanate ($H_{12}$MDI) has a rigid structure, so that the mechanical property of the resultant thermoplastic polyurethane is improved, and the cover which is excellent in the abrasion-resistance can be obtained.

The chain extender to be contained, based on the necessity, in the thermoplastic polyurethane to be used in the present invention may be those having two functional groups reactive with the isocyanate group, and examples thereof may include a low molecular weight diol, a diamine, an aminoalcohol, and the like. The hydroxyl value of these low molecular weight diols to be used as the chain extender is preferably 150 mg KOH/g or more, more preferably 180 mg KOH/g or more, and even more preferably 280 mg KOH/g or more. The hydroxyl value of the low molecular weight diols can be measured by, for example, an acetylation method according to JIS K 1557-1.

Examples of the low molecular weight diol may include ethylene glycol, diethylene glycol, triethylene glycol, 1,3-propanediol, 1,3-butanediol, 1,4-butanediol, neopentyl glycol, 1,6-hexanediol, 1,8-octanediol, and diols such as an aniline-based diol and a bisphenol A-based diol.

The polyamine may include an aliphatic polyamine such as ethylenediamine, and hexamethylenediamine, an alicyclic polyamine such as piperazine and isophoronediamine, and an aromatic polyamine. The aromatic polyamine has no limitation as long as it has two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having two amino groups bonded to one aromatic ring or a polycyclic aromatic polyamine having two aminophenyl groups each having at least one amino group bonded to one aromatic ring.

Examples of the monocyclic aromatic polyamine include a type such as phenylenediamine, toluenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include diaminobenzene having two aminophenyl groups directly bonded to each other or a compound having two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane and the derivatives thereof.

Among the above-mentioned chain extenders, in terms of improvement of the strength of the cover to be formed, the use of diols such as 1,4-butanediol and 1,8-octanediol are preferable, and particularly 1,4-butanediol is more preferable.

In the present invention, the number of the unsaturated carbon-carbon bond per unit mass in the thermoplastic polyurethane containing the polyol having the unsaturated carbon-carbon bond as a constituent before crosslinking with the crosslinking agent, which will be described later, is preferably $0.3 \times 10^{-3}$ mol/g or more, more preferably $0.5 \times 10^{-3}$ mol/g or more, and even more preferably $1.0 \times 10^{-3}$ mol/g or more. If the number of the unsaturated carbon-carbon bond per unit mass is less than $0.3 \times 10^{-3}$ mol/g, the crosslinking structure may be too little to improve the abrasion resistance of the cover. On the other hand, the number of the unsaturated carbon-carbon bond per unit mass is preferably less than $7.9 \times 10^{-3}$ mol/g, more preferably $6.0 \times 10^{-3}$ mol/g or less, and even more preferably $5.0 \times 10^{-3}$ mol/g or less. If the number of the unsaturated carbon-carbon bond per unit mass is not less than $7.9 \times 10^{-3}$ mol/g, the crosslinking structure becomes so much that the obtained cover may be hard and fragile.

The number X (mol/g) of the unsaturated carbon-carbon bond per unit mass in the thermoplastic polyurethane before crosslinking in the present invention can be calculated according to the following equation (1):
[Equation 1]

$$X = \frac{X1 \times (W1/Mn1)}{W} \quad (1)$$

wherein, W denotes the weight (g) of the thermoplastic polyurethane; W1 denotes the weight (g) of the polyol having the unsaturated carbon-carbon bond in the thermoplastic polyurethane; Mn1 denotes the number average molecular weight of the polyol having the unsaturated carbon-carbon bond; and X1 denotes the number of the unsaturated carbon-carbon bond per 1 mole of the polyol having the unsaturated carbon-carbon bond.

The number X1 of the unsaturated carbon-carbon bond per 1 mole of the polyol having the unsaturated carbon-carbon bond can be calculated according to the following equation (2):
[Equation 2]

$$X1 = (Mn1/M2) \times X2 \quad (2)$$

wherein, Mn1 is same as defined in the above equation (1); M2 denotes the molecular weight of the repeating unit constituting the polyol having the unsaturated carbon-carbon bond; and X2 denotes the number of the unsaturated carbon-carbon bond per 1 mole of the repeating unit. The polyol having the unsaturated carbon-carbon bond may have hydroxyl groups which are not included in the repeating unit, however the molecular weight thereof is sufficiently low as compared with the number average molecular weight Mn1. Therefore, when calculating the number X of the unsaturated carbon-carbon bond, the molecular weight of these hydroxyl groups can be ignored.

Typical examples of the thermoplastic polyurethane containing the polyol having unsaturated carbon-carbon bond as a constituent may include $H_{12}$MDI-polyol-1,4-BD-based thermoplastic polyurethane BD 10 (polyol component:

PTMG/polybutadiene polyol=90/10 (mole ratio)); BD 30 (polyol component: PTMG/polybutadiene polyol=70/30 (mole ratio)); BD 60 (polyol component: PTMG/polybutadiene polyol=40/60 (mole ratio)); BD 70 (polyol component: PTMG/polybutadiene polyol=30/70 (mole ratio)); and $H_{12}$MDI-polybutadiene polyol-1,4-BD-based thermoplastic polyurethane BD 100 manufactured by BASF Polyurethane Elastomers.

In addition to the above-mentioned thermoplastic polyurethane as a resin component, the cover composition of the present invention may further contain another resin component. Examples of another resin component may include ionomer resins, thermoplastic elastomers, diene block copolymers, and the like.

Examples of the ionomer resin are one prepared by neutralizing at least a part of carboxyl groups in a copolymer composed of ethylene and α,β-unsaturated carboxylic acid having 3 to 8 carbon atoms with a metal ion, or one prepared by neutralizing at least a part of carboxyl groups in a terpolymer composed of ethylene, α,β-unsaturated carboxylic acid having 3 to 8 carbon atoms and α,β-unsaturated carboxylic acid ester with a metal ion, and a mixture thereof. Examples of the α,β-unsaturated carboxylic acid are acrylic acid, methacrylic acid, fumaric acid, maleic acid, and crotonic acid. Among them, acrylic acid and methacrylic acid are preferable. Examples of the α,β-unsaturated carboxylic acid ester are methyl ester, ethyl ester, propyl ester, n-butyl ester, isobutyl ester and the like of acrylic acid, methacrylic acid, fumaric acid, maleic acid, and the like. Especially, the ester of acrylic acid and methacrylic acid are preferable. Examples of the metal ion for neutralizing at least a part of the carboxyl groups include alkali metal ions such as sodium, potassium, and lithium ions; divalent metal ions such as magnesium, calcium, zinc, barium, and cadmium ions; trivalent metal ions such as aluminum ion, or other metal ions such as tin, and zirconium ions. Among them, sodium, zinc, and magnesium ions are preferably used to improve the resilience and the durability.

Typical examples of the above-mentioned ionomer resins may include Himilan manufactured by Du Pont-Mitsui Polychemicals Co., Ltd., Surlyn manufactured by E.I. du Pont de Nemours and Company, and IOTEC manufactured by Exxon Chemical Company, and the like.

Specific examples of the thermoplastic elastomers include a thermoplastic polyamide elastomer having a commercial name of "PEBAX (e.g. "PEBAX 2533")" available from ARKEMA Inc, a thermoplastic polyester elastomer having a commercial name of "HYTREL (e.g. "HYTREL 3548" and "HYTREL 4047")" available from DU PONT-TORAY Co, a thermoplastic polystyrene elastomer having a commercial name of "Rabalon" available from Mitsubishi Chemical Corporation, and the like. Among them, the thermoplastic polystyrene elastomer is preferred. Examples of the thermoplastic polystyrene elastomer include a polystyrene-diene type block copolymer which contains a polystyrene block component as a hard segment and a diene block component such as polybutadiene, isoprene, hydrogenated polybutadiene, and hydrogenated polyisoprene as a soft segment. The polystyrene-diene type block copolymer is one having a double bond derived from a conjugated diene compound of a block copolymer or a partially hydrogenated block copolymer. Examples of the polystyrene-diene type block copolymer include a block copolymer of SBS (styrene-butadiene-styrene) structure having a polybutadiene block, or a block copolymer of SIS (styrene-isoprene-styrene) structure.

In the case where the cover composition of the present invention contains a component other than the thermoplastic polyurethane, such as an ionomer resin, as a resin component, it is preferable that the main component of the resin components is the above-mentioned thermoplastic polyurethane. The content of the thermoplastic polyurethane in the above-mentioned resin components is preferably 50% by weight or more, more preferably 60% by weight or more, and even more preferably 70% by weight or more. Further, it is also preferable that the resin component essentially consists of the above-mentioned thermoplastic polyurethane.

Next, the crosslinking agent to be used in the present invention will be described. The crosslinking agent is not particularly limited if it reacts with the above-mentioned the unsaturated carbon-carbon bond of the polyol component to form the crosslinked structure. Examples thereof may include a radical polymerization initiator, an organic sulfur compound, and the like. The crosslinked structure may include an embodiment where the crosslinked structure is formed by reacting the crosslinking agent with the unsaturated carbon-carbon bond of the polyol component to bond the unsaturated carbon-carbon bond parts directly; an embodiment where the crosslinked structure is formed by reacting the unsaturated carbon-carbon bond parts with the crosslinking agent to crosslink the unsaturated carbon-carbon bond parts via the crosslinking agent such as an organic sulfur compound; an embodiment where the crosslinked structure is formed by reacting the unsaturated carbon-carbon bond parts with the crosslinking agent and the co-crosslinking agent to crosslink the unsaturated carbon-carbon bond parts via a graft chain consisting of the co-crosslinking agent.

The above-mentioned crosslinking agent is preferably a radical polymerization initiator capable of forming the crosslinked structure by reacting with the polymerizable unsaturated carbon-carbon bond part of the polyol component constituting the above-mentioned thermoplastic polyurethane. Examples of the above-mentioned radical polymerization initiator may include an organic peroxide, an azo compound, and the like.

Examples of the organic peroxides may include dicumyl peroxide, benzoyl peroxide, di-tert-butyl peroxide, cumene hydroperoxide, succinic peroxide, di(2-ethoxethyl)peroxydicarbonate, (α,α'-bis-neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxyneohexanoate, tert-amyl peroxy-2-ethylhexanoate, tert-butyl peroxypivalate, tert-amyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethylhexanoate, tert-hexyl peroxy-2-ethylhexanoate, tert-butyl peroxy-2-ethylhexanoate, tert-butyl peroxyisobutylate, tert-hexyl peroxyisopropyl monocarbonate, tert-butyl peroxy-3,5,5-tri-methylhexanoate, tert-butyl peroxylaurate, 2,5-dimethyl-2,5-bis(m-toluoylperoxy)hexane, tert-butyl peroxyisopropylmonocarbonate, tert-butyl peroxy-2-ethylhexyl monocarbonate, tert-hexyl peroxybenzoate, 2,5-dimethyl-2,5-bis(benzoylperoxy)hexane, tert-butyl peroxyacetate, tert-butyl peroxy-m-toluoylbenzoate, tert-butyl peroxybenzoate, bis-tert-butyl peroxyisophthalate, 2,4,4-trimethylpentyl peroxyphenoxyacetate, di-tert-butyl peroxyhexahydroterephthalate, di-tert-butylperoxyazelate, di-tert-butyl peroxytrimethyladipate, and the like. These organic peroxides may be used alone or in combination of two or more kinds thereof. Among them, dicumyl peroxide, tert-butyl peroxyneodecanonate, tert-hexyl peroxyneodecanoate, tert-butyl peroxypivalate, tert-amyl peroxypivalate, tert-hexyl peroxypivalate, tert-butyl peroxy-2-ethylhexanoate, tert-butyl peroxyisobutylate, and the like.

Typical examples of the above-mentioned organic peroxide may be Percumyl D (10-hour half-life temperature: 116.4° C.), Perbutyl D (10-hour half-life temperature: 123.7° C.), Percumyl H (10-hour half-life temperature: 157.9° C.), Perocta O (10-hour half-life temperature: 65.3° C.), Perhexa 250 (10-hour half-life temperature: 66.2° C.), Perhexyl O (10-hour half-life temperature: 69.9° C.), Perbutyl O (10-hour half-life temperature: 72.1° C.), Perhexyl I (10-hour half-life temperature: 95.0° C.), Perbutyl 355 (10-hour half-life temperature: 97.1° C.), Perbutyl L (10-hour half-life temperature: 98.3° C.), Perbutyl I (10-hour half-life temperature: 98.7° C.) and Perbutyl E (10-hour half-life temperature: 99.0° C.), manufactured by NOF Corporation. The 10-hour half-life temperatures thereof are all the values in benzene (peroxide concentration: 0.10 mol/L).

The above-mentioned azo compound may include dimethyl 2,2'-azobis(2-methylpropionate), 2,2'-azobis(2-methylbutyronitrile), 1,1'-azobis(cyclohexane-1-carbonitrile), azobisisobutyronitrile, azobiscyanovaleric acid and its salts, 2,2'-azobis(2-aminodipropane)hydrochloride, 2,2'-azobis(2-methyl-N-(2-)hydroxyethyl propionamide), and the like. These azo compounds may be used alone or in combination of two or more kinds thereof. Among them, dimethyl-2,2'-azobis(2-methylpropionate), azobisisobutyronitrile, and the like, are preferable.

Typical examples of the above-mentioned azo compounds include V-601 (10-hour half-life temperature: 66° C.), V-59 (10-hour half-life temperature: 67° C.), and V-40 (10-hour half-life temperature: 88° C.), manufactured by Wako Pure Chemical Industries Ltd. The 10-hour half-life temperatures thereof are all the values in toluene.

In the case that a radical polymerization initiator is used as the above-mentioned crosslinking agent, the 10-hour half-life temperature is preferably 60° C. or more, more preferably 70° C. or more, and even more preferably 80° C. or more to improve the efficiency of the crosslinking. On the other hand, the 10-hour half-life temperature of the radical polymerization initiator is preferably 150° C. or less, more preferably 140° C. or less, and even more preferably 130° C. or less. If the 10-hour half-life temperature of the radical polymerization initiator exceeds 150° C., the crosslinking does not so much proceed and the abrasion resistance may possibly be deteriorated and therefore it is not preferable. The 10-hour half-life temperature is a temperature at which the initial concentration of the above-mentioned organic peroxide or azo compound is decreased to a half in 10 hours and can be measured by an experiment in a diluted solution of benzene or the like.

As the organic sulfur compound used as the crosslinking agent, a diphenyl disulfide or a derivative thereof may be preferably used. Examples of the diphenyl disulfide or the derivative thereof include diphenyl disulfide; a mono-substituted diphenyl disulfide such as bis(4-chlorophenyl)disulfide, bis (3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl) disulfide; tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-penta bromophenyl)disulfide. Among them, diphenyl disulfide and bis(penta bromophenyl)disulfide are preferably used since the high resilience cover can be obtained.

The amount of the crosslinking agent to be contained in the cover composition is preferably 0.05 part by mass or more, more preferably 0.1 part by mass or more, even more preferably 0.2 part by mass or more, and preferably 5.0 parts by mass or less, more preferably 4.0 parts by mass or less, even more preferably 3.0 parts by mass or less based on 100 parts by mass of the thermoplastic polyurethane. If the blending amount of the crosslinking agent is less than 0.05 part by mass, it may be impossible to crosslink the unsaturated carbon-carbon bond parts in the polyol component sufficiently, while the blending amount of more than 5 parts by mass adversely affects the cover property and causes the economically inefficiency.

The cover composition of the present invention may further contain a co-crosslinking agent in addition to the crosslinking agent. The co-crosslinking agent is not particularly limited as long as it has the effect of crosslinking unsaturated carbon-carbon bond parts by graft polymerization to the polyol component. Examples of the co-crosslinking agent are $\alpha,\beta$-unsaturated carboxylic acid having 3 to 8 carbon atoms or a metal salt thereof, more preferably, acrylic acid, methacrylic acid or a metal salt thereof. As the metal constituting the metal salt, for example, zinc, magnesium, calcium, aluminum and sodium may be used. In the case that the co-crosslinking agent is used, the amount of the co-crosslinking agent to be used is preferably 50 parts or less, more preferably 40 parts or less based on 100 parts of the thermoplastic polyurethane by mass. If the amount of the co-crosslinking agent to be used is more than 50 parts by mass, the cover becomes too hard, so that the abrasion-resistance may be lowered.

The cover composition of the present invention may further contain a pigment such as a white pigment (preferably titanium oxide) and a blue pigment, a gravity adjusting agent such as calcium carbonate and barium sulfate, a dispersant, an antioxidant, an ultraviolet absorber, a light stabilizer, a fluorescent brightener or the like, to the extent that the performance of the cover is not undermined.

The content of the white pigment (preferably titanium oxide) in the cover composition is preferably 0.5 part by mass or more, more preferably 1 part by mass or more, and 10 parts by mass or less, more preferably 8 parts by mass or less, based on 100 parts by mass of the resin component constituting the cover. If the content of the white pigment is 0.5 part by mass or more, the cover has the high opacity. On the other hand, if the content is more than 10 parts by mass, the durability of the cover may be lowered.

The cover composition to be used in the present invention can be obtained by mixing a thermoplastic polyurethane having the polyol having the unsaturated carbon-carbon bond as a constituent, a crosslinking agent, and if necessary, a pigment, and the like. The mixing of the thermoplastic polyurethane having the polyol having the unsaturated carbon-carbon bond as a constituent, the crosslinking agent, the pigment, and the like may be carried out using for example, a mixer capable of blending a raw material in the form of pellet, more preferably a tumbler type mixer. The mixing of the cover composition is not particularly limited, as long as the mixing is carried out so as to suppress the promotion of the crosslinking of the thermoplastic polyurethane containing the polyol having the unsaturated carbon-carbon bond as a constituent before cover molding. The mixing of the cover composition includes, for example, an embodiment of dry blending the thermoplastic polyurethane having the polyol having the unsaturated carbon-carbon bond as a constituent, the crosslinking agent, and if necessary, an additive for the cover such as titanium oxide; and an embodiment of mixing the thermoplastic polyurethane having the polyol having the unsaturated carbon-carbon bond as a constituent with an additive for the cover such as titanium oxide, extruding the mixture in a white pellet previously, and dry blending the white pellet with the crosslinking agent.

The cover for the golf ball of the present invention can be prepared by molding the above mentioned cover composition. Examples of a method for molding a cover include a method wherein the cover composition is subjected to compression molding into hollow-shell shape, and the core is covered with a plurality of shells (preferably a method wherein a cover composition is compression-molded into hollow-half shell shape and the core is covered with two half shells), and a method wherein the cover composition is subjected to direct injection molding onto the core. In a preferable embodiment, the cover composition is injection-molded directly onto the core, wherein the cover composition is prepared by dry-blending the thermoplastic polyurethane having the polyol having the unsaturated carbon-carbon bond as a constituent, the crosslinking agent, and if necessary, an additive for the cover such as titanium oxide.

When subjecting the cover composition to compression molding to form a half shell, the compression molding is preferably conducted at the pressure of 1 MPa to 20 MPa and at the molding temperature ranging from −20° C. to 70° C. with respect to the flow starting temperature of the cover composition. Preparing the half shell at the above condition provides the half shell with the uniform thickness. When forming the cover with the half shells, the core preferably covered with two half shells is subjected to compression molding. When subjecting the half shells to compression molding to form a cover, the compression molding is preferably conducted at the molding pressure of 0.5 MPa to 25 MPa and at the molding temperature ranging from −20° C. to 70° C. with respect to the flow starting temperature of the cover composition. The above condition provides the cover with the uniform thickness.

When subjecting the cover composition to injection molding directly onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition is charged and then cooled to obtain a cover. For example, the cover composition heated to 200° C. to 250° C. is charged into a mold held under the pressure of 9 MPa to 15 MPa in 0.5 to 5 seconds. After cooling for 10 to 60 seconds, the mold is opened.

Where necessary, the golf ball formed with the cover is preferably subjected to surface treatment such as deburring, cleaning, and sandblast. If desired, a paint film or a mark may be formed.

In the present invention, the golf ball preferably has a cover with a thickness of 0.3 mm or more, more preferably 0.5 mm or more, even more preferably 1.0 mm or more. If the cover is too thin, the abrasion-resistance may be lowered. The golf ball of the present invention preferably has a cover with a thickness of 3.0 mm or less, more preferably 2.8 mm or less, even more preferably 2.5 mm or less. If the cover is too thin, the repulsion may be lowered.

The slab hardness of the cover composition of the golf ball of the present invention is preferably 30 or more, more preferably 32 or more, even more preferably 35 or more. If the cover is too soft, the flight distance becomes short due to the high spin rate. If the cover is too hard, the control ability may be lowered due to the low spin rate. Herein, the slab hardness of the cover means a hardness obtained by measuring the hardness of the cover composition molded into the sheet shape. The details of the method to measure the slab hardness is described later.

A structure of the golf ball of the present invention is not particularly limited as long as it has a core and a cover. Specific examples of the golf ball of the present invention include a two-piece golf ball having a core and an outermost cover covering the core; a three-piece golf ball comprising a core composed of a center and an intermediate layer covering the center and an outermost layer cover covering the core; a multi-piece golf ball having a core composed of a center and a plurality of or multi-layered intermediate layers and an outermost layer cover covering the core; and a wound-core golf ball having a wound core and a cover covering the wound core, and the like.

The core or the center of the golf ball of the present invention is preferably one (preferably spherical core) molded by heat-pressing a rubber composition (hereinafter simply referred to as "rubber composition for the core") containing, for example, a base rubber, a crosslinking initiator, a co-crosslinking agent, and, as necessary, a filler.

As the base rubber, a natural rubber and/or a synthetic rubber may be used. For example, a polybutadiene rubber, a natural rubber, a polyisoprene rubber, a styrene polybutadiene rubber, and an ethylene-propylene-diene rubber (EPDM) and the like may be used. Among them, in particular, a high cis-polybutadiene, particularly cis-1,4-polybutadiene having a cis bond of 40% or more, preferably 70% or more, more preferably 90% or more is preferably used in view of its superior repulsion property.

The crosslinking initiator is blended in order to crosslink the base rubber component. As the crosslinking initiator, an organic peroxide is preferred. Specifically, the crosslinking initiator includes an organic peroxide such as dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferably used. An amount of the organic peroxide to be blended is preferably 0.2 part by mass or more, more preferably 0.3 part by mass or more and preferably 3 parts by mass or less, more preferably 2 parts by mass or less with respect to 100 parts by mass of the base rubber. If it is less than 0.2 part by mass, the core becomes too soft so that resilience tends to be lowered, while if it is more than 3 parts by mass, an amount of the co-crosslinking agent needs to be increased to obtain an appropriate hardness, so that resilience tends to become insufficient.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably, acrylic acid, methacrylic acid or a metal salt thereof may be used. As the metal constituting the metal salt, for example, zinc, magnesium, calcium, aluminum and sodium may be used, and among them, zinc is preferred because it provides high resilience. An amount of the co-crosslinking agent to be used is preferably 10 parts by mass or more, more preferably 20 parts by mass or more and preferably 50 parts by mass or less, more preferably 40 parts by mass or less with respect to 100 parts by mass of the base rubber. If an amount of the co-crosslinking agent to be used is less than 10 parts by mass, an amount of the organic peroxide must be increased in order to obtain an appropriate hardness, so that resilience tends to be lowered. On the other hand, if an amount of the co-crosslinking agent to be used is more than 50 parts by mass, the core becomes too hard so that shot feeling tends to be lowered.

The filler contained in the rubber composition for the core is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts by mass or more, more preferably 3 parts by mass or more, and preferably 50 parts by mass or less, more preferably 35 parts by mass or less based on 100 parts by mass of the base rubber. If the amount of the filler to be blended is less than 2 parts by mass, it becomes difficult to adjust the weight, while if it is more than 50 parts by mass, the weight ratio of the rubber component becomes small and the resilience tends to be lowered.

As the rubber composition for the core, an organic sulfur compound, an antioxidant or a peptizing agent may be blended as appropriate in addition to the base rubber, the crosslinking initiator, the co-crosslinking agent and the filler.

As the organic sulfur compound, a diphenyl disulfide or a derivative thereof may be preferably used. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber. Examples of the diphenyl disulfide or the derivative thereof include diphenyl disulfide, a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained.

An amount of the antioxidant to be blended is preferably 0.1 part by mass or more and 1 part by mass or less with respect to 100 parts by mass of the base rubber. The peptizing agent is preferably 0.1 part by mass or more, 5 parts by mass or less with respect to 100 parts by mass of the base rubber.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

In the case that the golf ball of the present invention is a three-piece golf ball or multi-piece golf ball, a diameter of the center is preferably 30 mm or more, more preferably 32 mm or more, and preferably 41 mm or less, more preferably 40.5 mm or less. If the diameter of the center is less than 30 mm, it is necessary to make the intermediate layer or the cover thicker than a desired thickness, and as a result, resilience may become lowered. On the other hand, if the diameter of the center is more than 41 mm, it is necessary to make an intermediate layer or a cover thinner than a desired thickness, so that the intermediate layer or the cover layer cannot function sufficiently.

A core used for the golf ball of the present invention preferably has a diameter of 39 mm or more, more preferably 39.5 mm or more, even more preferably 40.8 mm or more, and preferably has a diameter of 42.2 mm or less, preferably 42 mm or less, more preferably 41.8 mm or less. If the diameter of the core is less than the lower limit, the cover may become too thick so that resilience becomes lowered. On the other hand, if the diameter of the core is more than the upper limit, the thickness of the cover becomes too thick so that molding of the cover becomes difficult.

The core, if it has a diameter of 39 mm to 42.2 mm, preferably has a compression deformation amount (an amount the golf ball shrinks along the direction of the compression) of 2.5 mm or more, more preferably 2.60 mm or more and preferably has a compression deformation amount of 3.20 mm or less, more preferably 3.10 mm or less when applying a load from 98 N as an initial load to 1275 N as a final load. If the compression deformation amount is less than 2.5 mm, the shot feeling becomes bad due to hardness, while if it is more than 3.20 mm, the resilience may be lowered.

It is a preferred embodiment that, the core having a surface hardness larger than the center hardness is used. A difference in the JIS-C hardness between a surface and a center of the core used for the golf ball the present invention is preferably 10 or more, more preferably 12 or more, and preferably 40 or less, more preferably 35 or less, even more preferably 30 or less. If the difference in hardness is more than 40, the durability tends to be lowered, and if the difference of the hardness is less 10, impact strength when hitting the golf ball becomes large so that it is difficult to obtain a good soft shot feeling. The surface hardness of the core is preferably 65 or more, more preferably 70 or more, even more preferably 72 or more, and preferably 85 or less in JIS-C hardness. If the surface hardness is less than 65 in JIS-C hardness, the golf ball may become too soft, resulting in lowering of flying performance. If the surface hardness is larger than 85, the golf ball may become too hard, resulting in lowering of the shot feeling. The center hardness of the core is preferably 45 or more, more preferably 50 or more, and is preferably 70 or less, more preferably 65 or less in JIS-C hardness. If the center hardness is less than 45, the golf ball tends to become so soft that the repulsion may be lowered, while if the center hardness is more than 70, the golf ball becomes so hard that the shot feeling may become lowered.

When preparing a multi-piece golf ball or a three-piece golf ball, a material for the intermediate layer includes, for example, a thermoplastic resin such as a polyurethane resin, an ionomer resin, nylon, polyethylene, and a thermoplastic elastomer such as a polystyrene elastomer, a polyolefin elastomer, a polyurethane elastomer, a polyester elastomer, a polyamide elastomer and the like, more preferably the ionomer resin.

Into the intermediate layer, a gravity adjusting agent such as a barium sulfate and tungsten, an antioxidant, a pigment and the like may be further blended in addition to the above resin component.

When preparing a wound-core golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber or a mixture of a natural rubber and a synthetic polyisoprene, sulfur, a vulcanization auxiliary agent, a vulcanization accelerator, and an antioxidant. The rubber thread is wound around the center in elongation of about 10 times length to form the wound core.

Examples

Hereinafter, the present invention will be described in more detail with reference to Examples, but the present invention is not restricted by the following Examples and can be suitably modified within the scope described above or below and such modifications are also included in the technical scope of the present invention.

[Evaluation Method]

(1) Abrasion-Resistance

A commercially available sand wedge was installed on a swing robot available from Golf Laboratories, Inc., and two points of a ball respectively were hit once at the head speed of 36 m/sec. to observe the areas which were hit. Abrasion-resistance was evaluated and ranked into four levels based on following criteria.

E (Excellent): Scratches were hardly present on the surface of the golf ball.
G (Good): Slight scratches were present on the surface of the golf ball.
F (Fair): The surface of the golf ball was somewhat scuffed, scuffing could be observed.
P (Poor): The surface of the golf ball was abraded considerably, and scuffing was conspicuous.

(2) Durability

Each golf ball was repeatedly hit with a metal head driver (XXIO S 11° available from SRI sports, ltd) attached to a swing robot manufactured by TRUETEMPER CO, at the head speed of 45 m/sec. to make the golf ball collide with a collision board. Times up to which the golf balls are cracked were measured. In addition, each value obtained was reduced to an index number relative to the measured value obtained in Golf ball No. 3 being assumed 100. The larger number indicates better durability.

(3) Slab Hardness of the Cover (Shore D Hardness)

A sheet having a thickness of about 2 mm was prepared using the cover composition by hot press molding, and the sheet was preserved at the temperature of 23° C. for two weeks. Three or more of the sheets were stacked on one another to avoid being affected by the measuring substrate on which the sheets were placed, and the stack was subjected to the measurement using P1 type automatic rubber hardness tester manufactured by Kobunshi Keiki Co., Ltd. equipped with Shore D type spring hardness tester prescribed by ASTM-D2240.

(4) Core Hardness

JIS-C hardness obtained by measuring a surface part of the spherical core using C type spring hardness tester specified by JIS-K 6301 was determined as the surface hardness, and JIS-C hardness measured by cutting a spherical core into hemispherical shape to measure a center of a cut surface thereof was determined as the center hardness of the core.

[Preparation of Golf Ball]

(1) Preparation of Core

Core A

The rubber composition for the core shown in Table 1 was kneaded, and was subjected to heat-pressing for 13 minutes in the upper and lower molds having a spherical cavity at the temperature of 160° C. to obtain a spherical core A having a diameter of 40.7 mm.

Core B

The rubber composition for the center shown in Table 1 was kneaded, and was subjected to heat-pressing for 15 minutes in the upper and lower molds having a spherical cavity at the temperature of 170° C. to obtain a spherical center B having a diameter of 38.5 mm and a weight of 34.9 g. The intermediate composition shown in Table 1 was mixed in a twin-screw kneading extruder to prepare the composition for intermediate layer into the form of the pellet. Extrusion was carried out in the following conditions: screw diameter of 45 mm, screw revolutions of 200 rpm, and screw L/D=35. The material was heated at a temperature between 150° C. and 230° C. at the die position of the extruder. The core B having a center and an intermediate layer covering the center (having a thickness of 1.6 mm) was prepared by directly inject-molding the obtained material for the intermediate layer onto the center thus obtained.

TABLE 1

| Core | A | B |
|---|---|---|
| Center | — | — |
| Polybutadiene rubber | 100 | 100 |
| Zinc oxide | 5.0 | 5.0 |
| Zinc acrylate | 35 | 35 |
| Barium sulfate | 14 | — |
| Diphenyl disulfide | 0.5 | 0.5 |
| Dicumyl peroxide | 1 | 1 |
| Intermediate layer | — | — |
| Himilan 1605 | — | 50.0 |
| Himilan AM7329 | — | 50.0 |
| Slab hardness | — | 64 |
| Core properties | — | — |
| Thickness of intermediate layer (mm) | — | 1.6 |
| Diameter of core (mm) | 40.7 | 41.7 |
| Compression deformation amount of core (mm) | 2.90 | 2.55 |
| Center hardness of core (JIS-C hardness) | 66 | 65 |
| Surface hardness of core (JIS-C hardness) | 85 | 98 |

Formulation: parts by mass
Notes on Table 1
Polybutadiene rubber: BR730 manufactured by JSR Corporation (high cis-polybutadiene: cis content of 96% or more).
Zinc oxide: "Ginrei R" manufactured by Toho-Zinc Co.
Zinc acrylate: ZNDA-90S manufactured by NIHON JYORYU KOGYO Co,.LTD.
Barium sulfate: barium sulfate BD manufactured by Sakai Chemical Industry Co. Ltd.
Dicumyl peroxide: Percumyl D manufactured by NOF Corporation.
Diphenyl disulfide: manufactured by Sumitomo Seika Chemicals Company Limited.
Himilan 1605: sodium ion-neutralized ethylene-methacrylic acid copolymer ionomer resin manufactured by MITSUI-DUPONT POLYCHEMICAL CO., LTD.
Himilan AM7329: zinc ion-neutralized ethylene-methacrylic acid copolymer-based ionomer resin manufactured by MITSUI-DUPONT POLYCHEMICAL.

(2) Preparation of Cover Composition and Golf Ball Body

The cover materials shown in Table 2 were dry-blended in a tumbler type mixer to prepare the cover composition and the resultant cover composition was injection-molded directly onto the core thus obtained to form the cover covering the core. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball was discharged. The surface of the obtained golf ball body was subjected to sandblast treatment and marking followed by coating a clear paint, drying at the temperature of 40° C. in an oven to dry the paint to obtain a golf ball having a diameter of 42.7 mm and a weight of 45.3 g.

The results of evaluating the resultant golf ball with respect to abrasion-resistance, and durability are shown in Table 2.

TABLE 2-1

| | Golf Ball No. | | | | | |
|---|---|---|---|---|---|---|
| | 1 | 2 | 3 | 4 | 5 | 6 |
| Type of Core | A | A | A | A | A | B |
| Cover composition | | | | | | |
| TPU-BD0 | — | — | — | — | — | — |
| TPU-BD10 | 100 | — | — | 50 | 100 | — |
| TPU-BD30 | — | 100 | — | 50 | — | 100 |
| TPU-BD60 | — | — | 100 | — | — | — |
| TPU-BD70 | — | — | — | — | — | — |
| TPU-BD100 | — | — | — | — | — | — |
| Percumyl D | 0.5 | 0.5 | 0.5 | 0.5 | 0.5 | — |
| V-601 | — | — | — | — | — | 0.5 |
| Titanium oxide | 4 | 4 | 4 | 4 | 4 | 4 |
| Cover Properties | — | — | — | — | — | — |
| Thickness (mm) | 1 | 1 | 1 | 1 | 1 | 0.5 |
| Slab hardness (ShoreD) | 49 | 51 | 51 | 50 | 49 | 51 |
| Number of double bonds in the TPU before crosslinking ($\times 10^{-3}$ mole/g) | 1.3 | 3.7 | 6.9 | 2.5 | 1.3 | 3.7 |
| Golf ball Properties | — | — | — | — | — | — |
| Abrasion-resistance | E | E | E | E | E | E |
| Durability | 117 | 123 | 100 | 120 | 114 | 120 |

Formulation: parts by mass,
TPU: Thermoplastic polyurethane

TABLE 2-2

| | Golf Ball No. | | |
|---|---|---|---|
| | 7 | 8 | 9 |
| Type of Core | A | A | A |
| Cover composition | | | |
| TPU-BD0 | 100 | — | — |
| TPU-BD10 | — | — | — |
| TPU-BD30 | — | — | — |
| TPU-BD60 | — | — | — |
| TPU-BD70 | — | 100 | — |
| TPU-BD100 | — | — | 100 |
| Percumyl D | 0.5 | 0.5 | 0.5 |
| V-601 | — | — | — |
| Titanium oxide | 4 | 4 | 4 |
| Cover Properties | — | — | — |
| Thickness (mm) | 1 | 1 | 1 |
| Slab hardness (ShoreD) | 48 | 55 | 58 |
| Number of double bonds in the TPU before crosslinking ($\times 10^{-3}$ mole/g) | 0.0 | 7.9 | 10.8 |
| Golf ball Properties | — | — | — |
| Abrasion-resistance | F | P | P |
| Durability | 96 | 97 | 91 |

Formulation: parts by mass,
TPU: Thermoplastic polyurethane
Notes on Table 2-1, 2-2
Thermoplastic polyurethane BD0: $H_{12}$MDI-PTMG-1.4-BD based thermoplastic polyurethane manufactured by BASF Polyurethane Elastomers., shore A hardness 85, number of double bonds 0 mole/g)
Thermoplastic polyurethane BD10: $H_{12}$MDI-Polyol-1.4-BD based thermoplastic polyurethane manufactured by BASF Polyurethane Elastomers., polyol component: PTMG/polybutadiene polyol = 90/10 (mole ratio), shore A hardness 85, number of double bonds 1.3 × $10^{-3}$ mole/g)
Thermoplastic polyurethane BD30: $H_{12}$MDI-Polyol-1.4-BD based thermoplastic polyurethane manufactured by BASF Polyurethane Elastomers., polyol component: PTMG/polybutadiene polyol = 70/30 (mole ratio), shore A hardness 85, number of double bonds 3.7 × $10^{-3}$ mole/g)
Thermoplastic polyurethane BD60: $H_{12}$MDI-Polyol-1.4-BD based thermoplastic polyurethane manufactured by BASF Polyurethane Elastomers., polyol component: PTMG/polybutadiene polyol = 40/60 (mole ratio), shore A hardness 85, number of double bonds 6.9 × $10^{-3}$ mole/g)
Thermoplastic polyurethane BD70: $H_{12}$MDI-Polyol-1.4-BD based thermoplastic polyurethane manufactured by BASF Polyurethane Elastomers., polyol component: PTMG/polybutadiene polyol = 30/70 (mole ratio), shore A hardness 85, number of double bonds 7.9 × $10^{-3}$ mole/g)
Thermoplastic polyurethane BD100: $H_{12}$MDI-Polybutadienepolyo-1.4-BD based thermoplastic polyurethane manufactured by BASF Polyurethane Elastomers., shore A hardness 85, number of double bonds 10.8 × $10^{-3}$ mole/g)
In the thermoplastic polyurethane BD0, BD10, BD30, BD60, BD70, and BD100, PTMG has a number average molecular weight of 2000, and polybutadiene polyol has a number average molecular weight of 2800.
Percumyl D: Dicumyl peroxide manufactured by NOF corporation (10-hour half-life temperature 116.4° C. (thermal decomposition in benzene, peroxide concentration 0.10 mol/L)
V-601: dimethyl 2,2'-azobis(2-methylpropionate) manufactured by Wako Pure Chemical Industries, LTd, 10-hour half-life temperature 66° C. (in toluene)
Titanium oxide: A220 available from Ishihara Sangyou Kaisha Ltd.

Golf balls Nos. 1 to 6 are the golf balls which comprise a core and a cover covering the core, wherein the cover is formed from a cover composition containing a thermoplastic polyurethane containing a polyol having an unsaturated carbon-carbon bond as a constituent, and a crosslinking agent. In any case, the abrasion resistance and the durability are superior to the golf ball No. 7 which does not contain a polyol having an unsaturated carbon-carbon bond. Furthermore, in Golf balls No. 8 and No. 9, since the number of the unsaturated carbon-carbon bond per unit mass in the thermoplastic polyurethane was more than 7.9×$10^{-3}$ mol/g, the abrasion-resistance and the durability were lowered.

The present invention can be applied to the golf ball having a cover, more specifically to the improvement of the cover containing polyurethane as a resin component.

The present invention provides a golf ball excellent in the abrasion resistance and durability without lowering the productivity, in a golf ball having a cover using a thermoplastic polyurethane as a resin component.

This application is based on Japanese Patent application No. 2,007-187,458 filed on Jul. 18, 2007, the contents of which are hereby incorporated by reference.

What is claimed is:

1. A golf ball comprising a core and a cover covering the core, wherein the cover is formed from a cover composition containing a thermoplastic polyurethane containing a polybutadiene polyol having an unsaturated carbon-carbon bond as a constituent and a crosslinking agent, the content of the polybutadiene polyol having the unsaturated carbon-carbon bond is from 5% to 60% by mole based on a total amount of polyol components constituting the thermoplastic polyurethane, and the number of the unsaturated carbon-carbon bonds per unit mass in the thermoplastic polyurethane before crosslinking with the crosslinking agent is 0.3×$10^{-3}$ mol/g or more and less than 7.9×$10^{-3}$ mol/g.

2. The golf ball according to claim 1, wherein the cover composition contains 0.05 part to 5 parts by weight of the crosslinking agent with respect to 100 parts by weight of the thermoplastic polyurethane.

3. The golf ball according to claim 2, wherein the crosslinking agent is a radical polymerization initiator.

4. The golf ball according to claim 3, wherein the radical polymerization initiator is an organic peroxide or an azo compound.

5. The golf ball according to claim 4, wherein the radical polymerization initiator has 10-hour half-life temperature of 60° C. or more.

6. The golf ball according to claim 5, wherein the cover composition further contain a co-crosslinking agent.

7. The golf ball according to claim 1, wherein the content of the polybutadiene polyol is from 10% to 55% by mole based on a total amount of polyol components constituting the thermoplastic polyurethane.

8. The golf ball according to claim 1, wherein the content of the polybutadiene polyol is from 15% to 50% by mole based on a total amount of polyol components constituting the thermoplastic polyurethane.

* * * * *